(12) United States Patent
Murtagh et al.

(10) Patent No.: US 10,732,700 B2
(45) Date of Patent: Aug. 4, 2020

(54) SELF-TIMED CLOCKED PROCESSOR ARCHITECTURE

(71) Applicant: Eta Compute, Inc., Westlake Village, CA (US)

(72) Inventors: Paul Murtagh, Westlake Village, CA (US); Gopal Raghavan, Thousand Oaks, CA (US)

(73) Assignee: Eta Compute, Inc., Westlake Village, CA (US)

( * ) Notice: Subject to any disclaimer, the term of this patent is extended or adjusted under 35 U.S.C. 154(b) by 116 days.

(21) Appl. No.: 16/233,946

(22) Filed: Dec. 27, 2018

(65) Prior Publication Data

US 2019/0196564 A1    Jun. 27, 2019

Related U.S. Application Data

(60) Provisional application No. 62/610,828, filed on Dec. 27, 2017.

(51) Int. Cl.
| | |
|---|---|
| *G06F 1/324* | (2019.01) |
| *G06F 1/28* | (2006.01) |
| *G06F 1/12* | (2006.01) |
| *G06F 1/3296* | (2019.01) |
| *G06F 1/3234* | (2019.01) |

(52) U.S. Cl.
CPC ............ *G06F 1/324* (2013.01); *G06F 1/12* (2013.01); *G06F 1/28* (2013.01); *G06F 1/3243* (2013.01); *G06F 1/3296* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,930,294 | A  * | 7/1999 | Chapman | G01R 23/02 327/48 |
| 10,419,005 | B2 * | 9/2019 | Shen | H03L 7/22 |
| 2004/0012415 | A1 * | 1/2004 | Kouzuma | G04G 3/02 327/113 |
| 2017/0017258 | A1 * | 1/2017 | Park | G06F 1/04 |
| 2018/0191358 | A1 * | 7/2018 | Wang | H03L 7/087 |
| 2018/0241312 | A1 * | 8/2018 | Cha | H03L 7/06 |

* cited by examiner

*Primary Examiner* — Raymond N Phan
(74) *Attorney, Agent, or Firm* — SoCal IP Law Group LLP; Angelo Gaz; Steven C. Sereboff

(57) ABSTRACT

There is disclosed a self-timed clocked synchronous processor having at least one combinatorial logic (CL) block for processing data. The CL block has a critical path with a propagation delay that is a minimum allowable clock period to perform data processing of the CL block at an operating voltage of the processor without a timing error due to a register of the processor receiving the critical path output before it is completed. The processor has a critical path oscillator to simulate the critical path propagation delay and create an oscillator clock signal with a period greater than the minimum allowable clock period. The oscillator clock signal is used to clock the register, avoiding the timing error. A power manager outputs an operating voltage to the processor that causes the oscillator clock to be faster than an external time reference period for completing the current task of the processor.

20 Claims, 3 Drawing Sheets

SELF-TIMED CLOCKED PROCESSOR ARCHITECTURE

RELATED APPLICATION INFORMATION

This patent claims priority from provisional patent application 62/610,828, filed Dec. 27, 2017, titled SELF-TIMED CLOCKED PROCESSOR ARCHITECTURE.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to self-timed clocked digital processor circuits, such as a low power synchronous processor that minimizes power consumption using dynamic voltage/frequency scaling and that has a self-timed clock from a critical path oscillator that models the critical path of the processor.

Description of the Related Art

In this patent, the term "processor" means a digital circuit that acts upon data to perform some function. A processor as referred to herein may be as simple as a single block of combinatorial logic or may be a microprocessor, a microcontroller, a digital signal processor, a graphic processor, a coprocessor, a network processor, or some other type of processor. A processor may typically, but not necessarily, execute multiple sequential steps to accomplish its assigned function. For example, a processor may execute a sequence of stored instructions. Processors that may not execute stored instructions include single-purpose processors such as encryption engines and fast Fourier transform engines. The sequence of operations performed by such engines may be controlled, for example, by a hardware state machine rather than stored instructions.

Combinatorial logic is a concept in which (e.g., for each block of combinatorial logic) two or more input states define one or more output states, where the resulting state or states are related by defined rules that are independent of previous states. Each of the inputs and output(s) can attain either of two states: logic 0 (low) or logic 1 (high). A common example is a simple logic gate such as one of the basic logic gates: AND, OR, XOR, NOT, NAND, NOR, and XNOR. The resulting state of these gates is generally calculated form the inputs states using one of two methods: a sum of products, or a product of sums. If the states of the inputs change, the output always obeys the rules for calculating the output result. The current state of the device is not affected by preceding states. This contrasts combinatorial logic with sequential logic, in which the current state of the device is affected by previous states. Logic gates are one of several types of devices that use combinatorial logic. Other forms include encoders, decoders, multiplexer s, comparators, and latches. Combinatorial logic may have a propagation delay between when it receives inputs and when it provides an output that is dependent upon the operating voltage being applied to the combinatorial logic.

Most digital processors in use today are synchronous, which is to say various elements within the digital processor operate synchronously in response to a common clock signal. The power consumption of a synchronous processor depends on the complexity of the processor (i.e. the number of gates and other functional elements), the clock rate, and the operating voltage. In general, higher operating speed requires higher operating voltage. To minimize the power consumption of a synchronous digital logic circuit, the circuit may be operated at the lowest possible clock rate consistent with the circuit function and the lowest voltage that will support operation at that clock rate. The methodology and tools for designing synchronous logic circuits are well developed, so long as the processor circuit is designed to operate from a power supply voltage substantially above the threshold voltage of the transistors comprising the processor. However, to achieve the lowest possible power consumption, it may be preferable to operate a digital logic circuit at a voltage near or below the transistor threshold voltage. While research papers have shown that near-threshold operation of synchronous processors (i.e., operation with a power supply voltage near the transistor threshold voltage) may be possible, the delay of near-threshold and below-threshold logic gates may vary by a factor of up to 100 over an operating temperature range, and may vary by a factor of five or more between gates at a single temperature. As a consequence, it is difficult, if not impossible, to estimate the minimum required clock frequency for near-threshold voltage operation of synchronous logic circuits.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

For low power synchronous processors, it is important to minimize power using dynamic voltage/frequency scaling without causing timing errors from outputting data from the processor before its outputs have reached their final values. For example, if changes in temperature or operating voltage cause the propagation delay of a critical path of the processor operating under minimal power to become longer than the clock period for outputting data from that path, the processor will output incorrect data and thus malfunction. To avoid such occurrences, a low power synchronous processor can minimize power consumption by reducing its operating voltage using dynamic voltage or frequency scaling while using a self-timed clock from a critical path oscillator that models the critical path of the processor.

Description of Apparatus

Figure 1:
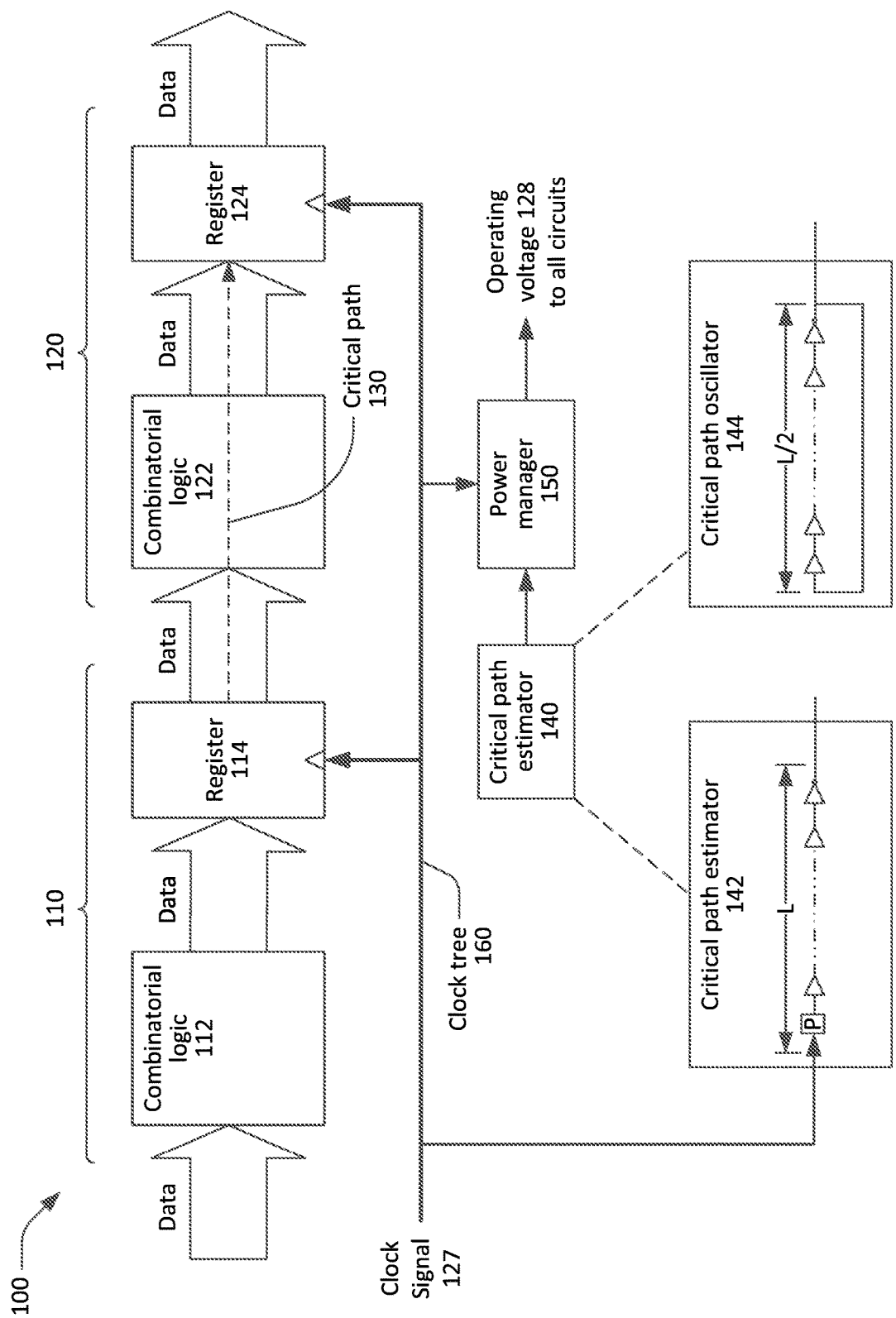
FIG. 1 is a block diagram of a conventional synchronous processor using dynamic voltage/frequency scaling to minimize power consumption.

FIG. 1 is a block diagram of a portion of an exemplary synchronous processor 100 using dynamic voltage or frequency scaling to minimize power consumption. All of the components shown for processor 100 may exist on the same integrated circuit (IC) chip and/or printed circuit board (PCB) while clock signal 127 is an external time reference signal provided from an external source that is not on that chip or PCB. The processor 100 may be a portion of a larger processor. The larger processor may have multiple instances of the processor 100. The components (e.g., circuits) of processor 100 include pipeline stage 110, pipeline stage 120, critical path estimator 140, critical path estimator 142, critical path oscillator 144 and power manager 150. In some cases, processor 100 has only one pipeline. In some cases, it includes additional components.

The processor 100 is represented by two pipeline stages 110, 120 for processing data. During processing, the stage 110 passes data to the stage 120. The stage 110 includes combinatorial logic 112 and register 114. The logic 112 processes received data, and outputs the processed data to register 114. The stage 120 includes combinatorial logic 122 and register 124. The logic 122 processes received data from register 114, and outputs the processed data to register 124.

Each of logic 112 and 122 may be one or more blocks of combinatorial logic. Each of logic 112 and 122 may be combinatorial logic having a propagation delay between when it receives inputs and when it provides an output that is dependent upon the operating voltage 128 being applied to the combinatorial logic. The logic 122 includes the critical path 130 which is a path of logic between the inputs and outputs of the of pipeline 110 and 120 that provide the output later or slower than any of the other paths of the logic between the inputs and outputs of the of pipeline 110 and 120. The critical path 130 has a propagation delay between when it receives inputs and when it provides an output that is dependent upon the operating voltage 128 being applied to it. The "operating voltage" 128 output from the power manager block 150 (possibly should be a "power supply" block) is the power supply voltage to the logic 122 often known as VDD. Here, this is the voltage that powers all of the circuits/components (registers 114 and 124; combinatorial logic 112 and 122; critical path 130; critical path estimator 142 and oscillator 144; etc.) of processor 100. Thus, in this case, the delay of both the critical path 130 and the period of the critical path oscillator 140 are highly dependent on the operating voltage 128 because this voltage determines the gate-level propagation delays of the circuits/components of the processor 100. The processor portion 100 is exemplary, and a synchronous processor may have more than two pipeline stages, and may be or include structures (for example, a state machine) that are not pipelines.

In the processor 100, the registers 114, 124 are clocked by a common clock signal 127 delivered by a clock tree 160 to clock inputs of those registers. The clock signal 127 may be a clock signal for certain components of processor 100 that is received from a synchronous clock that is located away from or not on the same IC chip as processor 100. It may be located on a PCB that the IC chip having processor 100 is located on, or a different PCB. That clock may experience a different temperature and/or voltage changes than those experience by processor 100. In some cases, the clock signal 127 comes from a reliable source, such as a real time clock, external to the processor 100 and has a frequency that is fixed and does not depend on the operating voltage 128.

The clock signal 127 is also delivered by the tree 160 to clock the critical path estimator 142, the critical path oscillator 144 and power manager 150. The clock signals output by the critical path estimator 142 and the critical path oscillator 144 are received by the critical path estimator 140 which outputs an estimated propagation delay signal to the power manager 150. Based on the estimated propagation delay signal, the power manager 150 outputs the operating voltage 128 to all circuits (e.g., to logic 122 and path 130) to be the operating voltage of the components of processor 100. Thus, the propagation delay of the components of processor 100 depends upon the voltage level of operating voltage 128.

For example, the power manager circuit 150 compares a frequency of the estimated propagation delay signal generated by the critical path estimator 140 to clock signal 127 and adjusts the operating voltage 128 such that the estimated propagation delay (e.g., the task for path 130) is completed within the desired time of a period of signal 127. That is, manager 150 may increase the voltage 128 to speed up processing by processor 100 if the estimated time signal generated by the critical path estimator 140 is slower than the clock signal 127. However, this increase may not be immediate or may not cause path 130 to increase in speed before the signal 127 causes the register 124 to receive or read the data output by the logic 122 (and path 130) which is not yet complete and may be inaccurate.

Somewhere within the combinatorial logic blocks 112, 122, is a critical path 130. The critical path is "critical" because it determines (for a given operating voltage) the minimum allowable clock period (or maximum allowable clock frequency). If the clock period is less than a propagation delay of the critical path 130, the clock will arrive at register 124 before the data has propagated to the end of the critical path 130, causing incorrect data to be captured in the register.

The critical path 130 is typically a path having the largest number of gates in sequence. However, the critical is typically not unique. For example, if the combinatorial logic 122 implements a 64-bit adder, the combinatorial logic 122 will have 64 paths with the same number of gates. For a given chip, operating voltage, and temperature, any one of these 64 paths may be the critical path 130. For a different chip, or a different operating voltage, or a different temperature, a different one of these paths may be the critical path. Thus, it is typically impossible to uniquely identify the critical path in a complex processor.

To reduce the power consumption of the exemplary processor 100 for a given task, the clock frequency of signal 127 may be set at, or slightly above, the lowest frequency that completes the task in an allotted time. The allotted time may be a period in which the data output or processor 100 is needed for further processing or to complete another task. For example, if a task takes 1000 clock cycles to complete, and must be completed within 1 millisecond, the lowest clock frequency that can be used for signal 127 is 1000 cycles divided by 1 millisecond=1 megahertz. If the same task must be completed every second, the minimum clock frequency would be 1 kilohertz. If the same task must be completed every minute, the minimum clock frequency would be about 17 Hertz. The clock frequency for signal 127 may be dynamic and set to different values for different tasks.

To minimize the power consumption of the exemplary processor 100 for a given task, the operating voltage 128 may be set by the manager 150 to, or just above, the lowest voltage that supports operating signal 127 at the selected clock frequency. As previously discussed, it is difficult, if not impossible, to estimate the minimum operating voltage for a synchronous processor operated at a very low clock frequency. Thus, the exemplary processor 100 includes a critical path estimator 140 to estimate the propagation delay of the critical path 130. The power manager circuit 150 compares the output of the critical path estimator 140 (e.g., the estimated propagation delay for path 130) and the clock signal 127 and sets the operating voltage 128 such that the estimated propagation delay of the critical path 130 from estimator 140 is shorter than the clock period of the signal 127.

A variety of circuits may be used for the critical path estimator 140. The critical path estimator 142 and the critical path oscillator 144 are two such example circuits. The manager 150 may use either or both of their outputs to generate the voltage 128, such as by comparing the output of either or both to the signal 127.

For one example, a critical path estimator 142 includes a pulse generator P triggered by the clock signal 127 and a delay line comprised of gates (e.g., the right pointing triangles in the figure) in series. The length L of the delay line may be at least as long as the length of the critical path and typically longer to provide a margin for error. In some cases, the period of delay between when an input signal arrives at the estimator and an output for that signal from the estimator is at least as long as the period of delay between when an input signal arrives at the critical path 130 and an output for that signal from the critical path 130.

For a further example, the critical path estimator 144 may be a critical path oscillator including a plurality of gates (e.g., the right pointing triangles in the figure) in series, including an odd number of inverting gates, connected in a ring that starts with the signal 127. The length of the delay of the ring may be at least half that of the length of the critical path estimator 142, and typically longer to provide a margin for error. In another case, the length of the delay of the ring may be at least half that of the length of the critical path 130, and typically longer to provide a margin for error. In some cases, the period of delay between when an input signal arrives at the oscillator and an output for that signal from the oscillator is at least as long as the period of delay between when an input signal arrives at the critical path 130 and an output for that signal from the critical path 130. In one case, the number of gates of oscillator 144 is selected to in order to make the delay of oscillator 144 at least half of the delay of 130 plus one or more additional gates for margin (plus taking into account the inversion required for oscillation of the oscillator 144). The identification of critical path 130, length of the critical path, estimator 142, oscillator 144 and length of the estimator and/or oscillator may be determined during design and/or testing of processor 100.

A change in the temperature of processor 100 and/or or the IC chip of that processor may change the operating speed of the components of the processor 100 due to the electrical characteristics of those components changing (e.g., faster or slower processing) with the change in their temperature. Also, changes in the operating voltage 128 of the processor 100 may change the operating speed of the components of the processor 100 due to the dependence of their processing speed upon the voltage level of the voltage 128.

An increase in temperature of processor 100 or reduction of the operating voltage 128 may cause the propagation delay of the critical path 130 of the processor operating under minimal power to become longer than the clock period for outputting data from that path to register 124, and thus the processor will output incorrect data and malfunction. It is noted that temperature characteristics causing delays to increase or decrease in the propagation delay of the processor may depend on the process technology and operating voltage.

For example, an increase in temperature and/or droop in operating voltage 128 may cause the logic 122 or path 130 to slow down in processing speed. However, there is a delay between when the slow down occurs and when manager 150 can change the operating voltage 128 to speed up processing of logic 122 and the path 130. During this delay, the clock signal 127 may not change, due to the source (e.g., the clock or clock signal generator) of the signal 127 existing remotely and not experiencing the temperature and/or voltage change experience by processor 100. Consequently, there may be a timing error if the speed of the clock signal 127 does not change while the processing speed of the path 130 slows down because the signal 127 will cause the register 124 to store the data from the logic 122 which includes the path 130 before the path 130 is done processing that data to a proper output. That is, there may be an error due to the propagation delay of the path 130 becoming longer than the clock period of the signal 127 for outputting data from the pipelines which causes the register 124 to store incorrect or not yet complete data and the processor 100 to malfunction.

Figure 2:
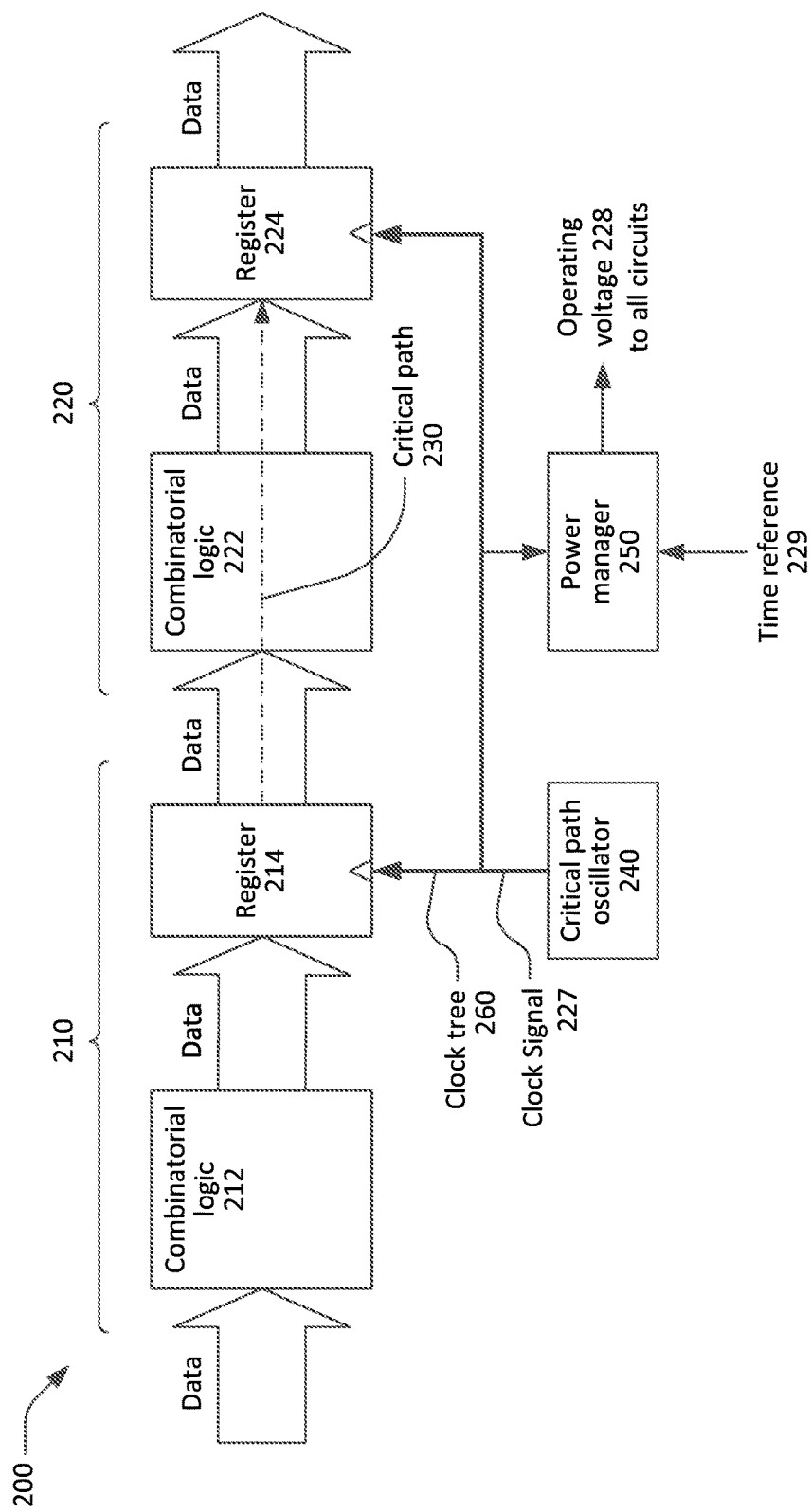
FIG. 2 is a block diagram of a self-timed synchronous processor using dynamic voltage/frequency scaling.

To avoid such occurrences, a low power synchronous processor can minimize power consumption by reducing its operating voltage using dynamic voltage or frequency scaling while using a self-timed clock from a critical path oscillator that models the critical path of the processor. For example, FIG. 2 is a block diagram of a portion of an improved, self-timed synchronous processor 200 using dynamic voltage/frequency scaling to minimize power consumption. All of the components shown for processor 200 may exist on the same integrated circuit (IC) chip and/or printed circuit board (PCB) including critical path oscillator 240 which generates the oscillator clock signal 227. The processor 200 may be or be a small portion of a larger processor. The larger processor may have multiple instances of the processor 200. The components (e.g., circuits) of processor 200 include pipeline stage 210, pipeline stage 220, critical path oscillator 240 and power manager 250. In some cases, processor 200 has only one pipeline. In some cases, it includes additional components.

The architecture of the pipelines 210 and 220 of exemplary processor 200 for processing data is similar to that of the previously-described pipelines 110 and 120 of processor 100. For example, each of logic 212 and 222 may be one or more blocks of combinatorial logic that are logic 112 and 122. Note that the exemplary processor 200 is synchronous, which is to say all registers 214 and 224 are clocked by a common oscillator clock signal 227 distributed by a clock tree 260.

The logic 222 includes the critical path 230 which is the same as path 130 for the logic 122. The processor portion 200 is exemplary, and a synchronous processor may have more than two pipeline stages, and may be or include structures (for example, a state machine) that are not pipelines.

The processor 200 includes a critical path oscillator 240 to estimate a propagation delay of the critical path 230 and generate the clock signal 227 certain to have a period longer than the delay time of the critical path 230. In this case, the critical path oscillator 240 generates the oscillator clock signal 227 distributed to the registers 214, 224 by the clock tree 260.

As compared to externally clocked processor 100, processor 200 can be described as self-timed because the components of pipelines 210 and 220 are clocked by the local oscillator clock signal 227 instead of an external clock signal 127. For instance, as compared to externally clocked processor 100, the components of processor 200 operate at self-timed speeds that are dependent upon the oscillator clock signal 227 and the operating voltage 228 to all circuits of processor 200 which are both generated at or by the processor 200. In some cases, the "operating voltage" 228 output from the power manager block 250 (possibly should be a "power supply" block) is akin to a biasing voltage to the logic 222 often known as VDD. Here, this is the voltage that powers all of the circuits/components (registers 214 and 224; combinatorial logic 212 and 222; critical path 230; critical path oscillator 240; etc.) of processor 200. Thus, in this case, the delay of both the critical path 230 and the period of the critical path oscillator 240 are highly dependent on this voltage 228 because this voltage determines the gate-level propagation delays of the circuits/components of the processor 200.

In the processor 200, the registers 214, 224 are clocked by a local oscillator common clock signal 227 delivered by a clock tree 160 to clock inputs of those registers. The clock signal 227 may be a clock signal for certain components of processor 200 that is receive from the oscillator 240 that is located on the same IC chip with or as part of processor 200. The oscillator 240 may experience the same temperature and/or voltage changes as those experience by other components of the processor 200.

The clock signal 227 is also delivered by the tree 260 to clock the power manager 250. The clock signal 227 output by the critical path estimator 140 can be described as an estimated propagation delay signal to the power manager 250. Based on the clock signal 227, the power manager 250 outputs the operating voltage 228 to all circuits (e.g., to logic 222 and path 230) to be the operating voltage of the components of processor 200. Thus, the propagation delay of the components of processor 200 depends upon the voltage level of voltage 228.

As noted for signal 127 of processor 100, to reduce the power consumption of the exemplary processor 200 for a given task, the clock frequency of signal 229 may be set at, or slightly above, the lowest frequency that completes the task or the propagation delay of path 230 in an allotted time. The allotted time may be a period in which the data output or processor 200 is needed for further processing or to complete another task.

The signal 229 may be an external clock signal as noted for signal 127 which provides a maximum reference time period for completing the task of the path 230. In some cases, the signal 229 comes from a reliable source, such as a real time clock, external to the processor 200 and has a frequency that is fixed and does not depend on the operating voltage 228. For example, the power manager circuit 250 compares a frequency of the signal 227 to time reference signal 229 and adjusts the operating voltage 228 such that the estimated propagation delay or signal 227 (e.g., the task for path 230) is completed within the desired time of a period of signal 229.

That is, manager 250 may increase the voltage 228 to speed up processing by processor 200 if the clock signal 227 is slower than the time reference signal 229. As compared to processor 100, to avoid a timing error, this increase does not have to be immediate or cause path 230 to increase in speed before the signal 227 causes the register 224 to receive or read the data output by the logic 222 (and path 230) because the register 224 is clocked by the signal 227 and cannot receive or read incomplete data due to a difference in the voltage 228 and the speed of signal 227 cause by oscillator 240 having a different temperature or operating voltage than the components of processor 200. That is, logic 222, path 230 and oscillator 240 are all operated at and have a propagation delay dependent upon voltage 228 and possibly based on the temperature of processor 200 which they share. Thus, register 224 cannot receive or read incomplete or inaccurate output data from logic 222 due to a difference in their operating voltage or clock speeds because the logic 222 and oscillator 240 (which outputs the clock signal 227 to the register 224) are operating at a same speed with respect to having the same operating voltage 228.

A variety of circuits having an oscillating output and a propagation delay greater than that of the path 230 may be used for the critical path oscillator 240. The critical path oscillator 144 is one such example circuit when, oscillator 240 is estimating or simulating the propagation delay of path 230 which is the same at path 130. The manager 250 may use the output of the oscillator 240 to generate the voltage 228, such as by comparing the output propagation delay or oscillation cycle of oscillator 240 to that of the reference signal 229. The identification of critical path 230, length of the critical path, oscillator 240 and length of the oscillator may be determined during design and/or testing of processor 200.

As for processor 100, a change in the temperature of processor 200 and/or or the IC chip of that processor may change the operating speed of the components of the processor 200 due to the electrical characteristics of those components changing (e.g., faster or slower processing) with the change in their temperature. Also, changes in the operating voltage 228 of the processor 200 may change the operating speed of the components of the processor 200 due to the dependence of their processing speed upon the voltage level of the voltage 228. However, as noted, this will not cause a timing error due to register 224 receiving or reading incomplete output date from logic 222 or path 230.

However, unlike the processor 100, a perturbation (such as a transient droop in the operating voltage 228 or the temperature of processor 200) that increases the propagation delay of the critical path 230 will proportionally increase the period of the clock signal 227 generated by the critical path oscillator 240. Thus, when the power manager circuit 250 compares a frequency of the clock signal 227 generated by the critical path oscillator 240 to a time reference signal 229 representing a desired completion time of a task (e.g., propagation delay for path 230) and adjusts the operating voltage 228 such that the task is completed within the desired time, there will not be a timing error.

That is, unlike the processor 100, a perturbation (such as a transient droop in the operating voltage) that increases the propagation delay of the critical path 230 also increases the period of the clock signal 227 generated by the critical path oscillator 240. Thus, the processor 200 will not malfunction by storing incorrect data (but may, in the worst case, fail to meet the time objective). Further, since the clock frequency of signal 227 automatically tracks the operating voltage 228, the processor 200 can be operated from a variable operating voltage and thus be used as a low power synchronous processor.

Figure 3:
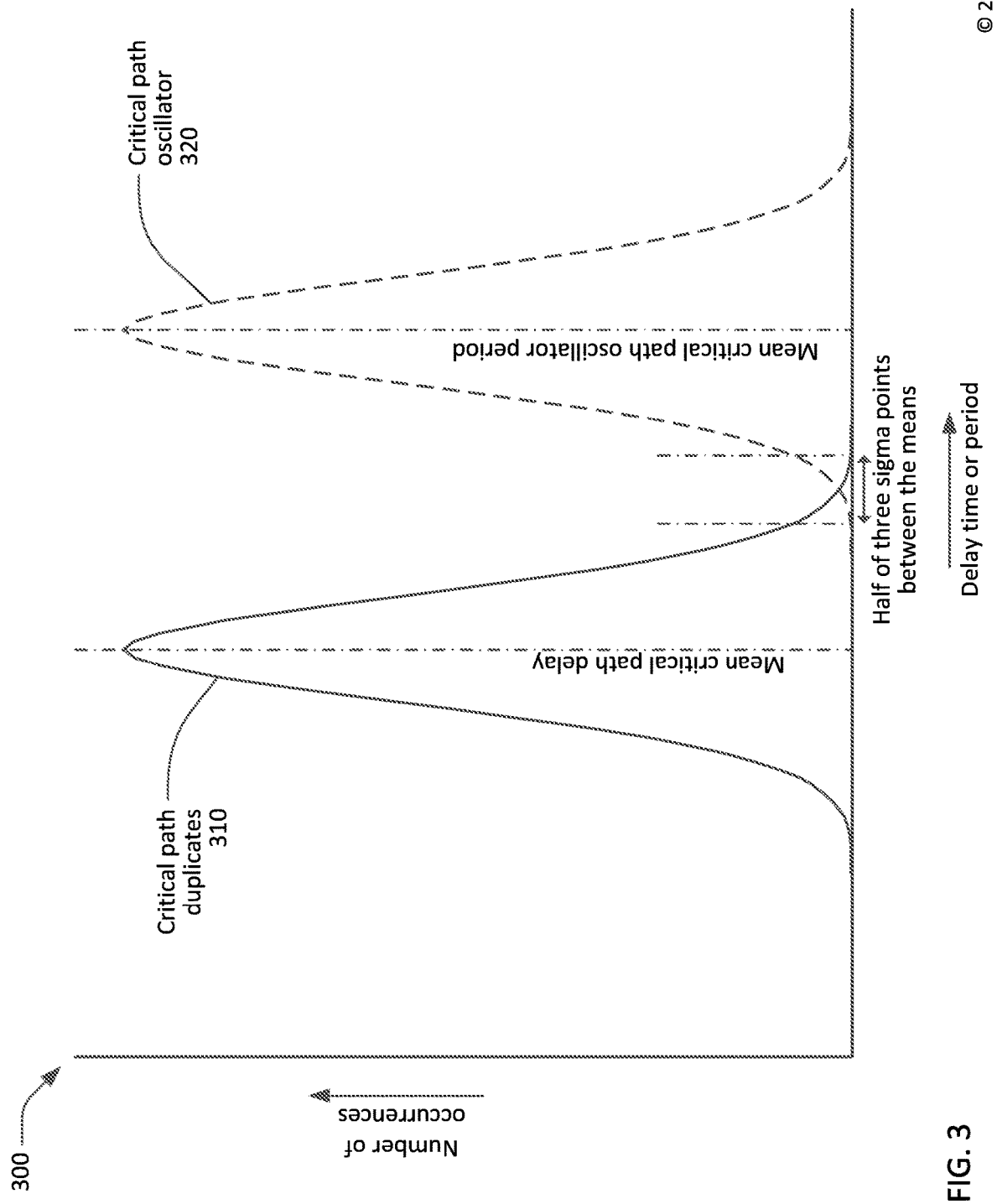
FIG. 3 is a chart showing statistical distribution of delay times of a critical path.

As previously discussed, the critical path in a processor may be one of a plurality of duplicate (at least in the number of gates) paths. At a given operating voltage and temperature, the propagation delay of these paths will follow a statistical distribution as shown by curve 310 in FIG. 3. Similarly, the period of a critical path oscillator (at the same operating voltage and temperature) will also follow a statistical distribution, as shown by the curve 320. FIG. 3 assumes the propagation delay and oscillator period both fit normal, or Gaussian, distributions, but may better fit other statistical functions.

To ensure that a self-timed processor operates properly, the statistical distribution 310 of the propagation delay of the critical path 230 and the statistical distribution 320 of the period of a critical path oscillator 240 may be determined by measurements, typically at the lowest anticipated operating voltage (e.g., voltage 228) and worst-case temperature. The number of gates in the critical path oscillator 240 may then be set such that the expected number of cases where the propagation delay of the critical path (curve 310) is longer than the oscillator period (curve 320) is very small. For example, the number of gates in the oscillator may be set such that the two distributions 310, 320 intersect at one half of the respective 3 sigma points that are on the sides of each mean that is towards the other mean, as shown in FIG. 3 (e.g., as perhaps overemphasized by the scale of overlap shown in FIG. 3). In one example, the two distributions 310, 320 fit normal, or Gaussian, distributions and intersect at one half of the respective 3 standard deviations of each distribution that are on the insides of each mean, towards the other mean, such that they overlap for 0.135 percent of each distribution. That is, the 3 sigma percentile is 0.27% outside of the each distribution so half would be 0.135%. In one case, the number of failures, where the critical path 230 propagation delay is longer than the oscillator period of signal 227, will be very, very small (e.g., roughly two per million).

Closing Comments

Throughout this description, the embodiments and examples shown should be considered as exemplars, rather than limitations on the apparatus and procedures disclosed or claimed. Although many of the examples presented herein involve specific combinations of method acts or processor elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A self-timed clocked synchronous processor comprising:
a combinatorial logic (CL) block operated at an operating voltage of the processor, the CL block having:
CL logic to process the CL input data signals from a first register using CL data process values to output CL output data signals to a second register, the CL logic having a critical path with propagation delay that is a minimum allowable clock period to perform data processing of the CL logic at the operating voltage of the processor without a timing error;
a critical path oscillator operated at the operating voltage of the processor and having:
oscillator logic to simulate the critical path and to create an oscillator clock signal with a period that is greater than the minimum allowable clock period;
an oscillator output to output an oscillator clock signal to clock the first register, the second register and a power manager; and
the power manager operated at the operating voltage of the processor and having:
an oscillator clock signal input to receive the oscillator clock signal;
a time reference input to receive an external time reference signal; and
a bias voltage output to output the operating voltage of the processor based on the time reference signal and the oscillator clock signal.

2. The self-timed processor of claim 1, wherein the critical path and the critical path oscillator each have a propagation delay between when they receive inputs and when they provide an output that are dependent upon the operating voltage; and
wherein the critical path oscillator estimates a propagation delay of the critical path and generates the oscillator clock signal certain to have a period longer than the delay time of the critical path.

3. The self-timed processor of claim 1, wherein the critical path has a first set CL logic gates; and wherein the critical path oscillator has a second set of gates that includes the first set of gates and at least one additional gate.

4. The self-timed processor of claim 1, wherein the critical path oscillator has an odd number of inverting gates connected in a ring and has a number of gates that is at least half a number of gates of the critical path.

5. The self-timed processor of claim 1, wherein the CL logic has digital logic gates and digital registers to process the CL input data signals using CL data process values to create the CL output data signals from the CL data process values.

6. The self-timed processor of claim 1, wherein the power manager includes circuitry to reduce the operating voltage to a lowest value needed for the critical path to perform data processing of the CL logic at the operating voltage of the processor without a timing error.

7. The self-timed processor of claim 1, wherein the power manager includes circuitry to output the operating voltage at a level sufficient to cause the critical path to perform data processing of the CL logic at the operating voltage of the processor without a timing error.

8. The self-timed processor of claim 1, wherein the power manager includes a comparator to compare the oscillator clock signal and the time reference signal to set the operating voltage such that the period of the oscillator clock signal is shorter than a period of the time reference signal.

9. The self-timed processor of claim 2, wherein a timing for the first register to read data from the CL block is determined by the oscillator clock signal.

10. A self-timed clocked synchronous processor comprising:
 a combinatorial logic (CL) block operated at a speed dependent upon an operating voltage of the processor, the CL block having:
  CL logic to process CL input data signals received from a first register using CL data process values, the CL logic having a critical path with propagation delay between receiving the input data and outputting data to a second register that is a minimum allowable clock period to perform data processing of the CL logic at the operating voltage of the processor without a timing error;
 a critical path oscillator operated at a speed dependent upon the operating voltage of the processor and having:
  an oscillator output to output an oscillator clock signal to clock the first register, the second register and a power manager, the oscillator clock signal having a period that is greater than the minimum allowable clock period; and
 the power manager having:
  a bias voltage generator to output the operating voltage of the processor based on the oscillator clock signal and an external time reference signal.

11. The self-timed processor of claim 10, wherein the critical path and the critical path oscillator each have a propagation delay between when they receive inputs and when they provide an output that are dependent upon the operating voltage;
 wherein a timing for the first register to read data from the CL block is determined by the oscillator clock signal; and
 wherein the critical path oscillator estimates a propagation delay of the critical path and generates the oscillator clock signal certain to have a period longer than the delay time of the critical path.

12. The self-timed processor of claim 10, wherein the critical path has a first set CL logic gates; and wherein the critical path oscillator has a second set of gates that includes the first set of gates and at least one additional gate; or
 wherein the critical path oscillator has an odd number of inverting gates connected in a ring and has a number of gates that is at least half a number of gates of the critical path.

13. The self-timed processor of claim 10, wherein the CL logic has digital logic gates and digital registers to process the CL input data signals using CL data process values to create the CL output data signals from the CL data process values.

14. The self-timed processor of claim 10, wherein the power manager includes circuitry to reduce the operating voltage to a lowest value needed for the critical path to perform data processing of the CL logic at the operating voltage of the processor without a timing error.

15. The self-timed processor of claim 10, wherein the power manager includes a comparator to compare the oscillator clock signal and the time reference signal to set the operating voltage such that the period of the oscillator clock signal is shorter than a period of the time reference signal.

16. A method of processing data within a self-timed clocked synchronous processor comprising:
 operating a combinatorial logic (CL) block at an operating voltage of the processor to process CL input data signals from a first register using CL data process values and to provide CL output data signals from the CL block to a second register, the CL block having a critical path that operates at the operating voltage with a propagation delay that is a minimum allowable clock period to perform data processing of the CL block of the processor without a timing error;
 operating a critical path oscillator at the operating voltage of the processor to output an oscillator clock signal with a period that is greater than the minimum allowable clock period to clock the first register, the second register and a power manager; and
 operating the power manager to output the operating voltage of the processor based on the oscillator clock signal and an external time reference signal.

17. The method of claim 16, wherein the critical path and the critical path oscillator each have a propagation delay between when they receive inputs and when they provide an output that are dependent upon the operating voltage;
 wherein a timing for the first register to read data from the CL block is determined by the oscillator clock signal; and
 wherein operating the critical path oscillator generates the oscillator clock signal certain to have a period longer than the delay time of the critical path.

18. The method of claim 16, wherein the propagation delay of the critical path oscillator is at least a delay of one logic gate more than the propagation delay of the critical path.

19. The method of claim 16, wherein the power manager reduces the operating voltage to a lowest value needed for the critical path to perform data processing of the CL block at the operating voltage of the processor without a timing error.

20. The method of claim 16, wherein outputting the operating voltage includes comparing the oscillator clock signal and the time reference signal, and setting the operating voltage such that the period of the oscillator clock signal is shorter than a period of the time reference signal.

* * * * *